March 24, 1970     W. E. MARTIN     3,501,856
SELF-CONTAINED SCRAPER ATTACHMENT ASSEMBLY FOR FARM TRACTOR
Filed Jan. 18, 1968     4 Sheets-Sheet 1
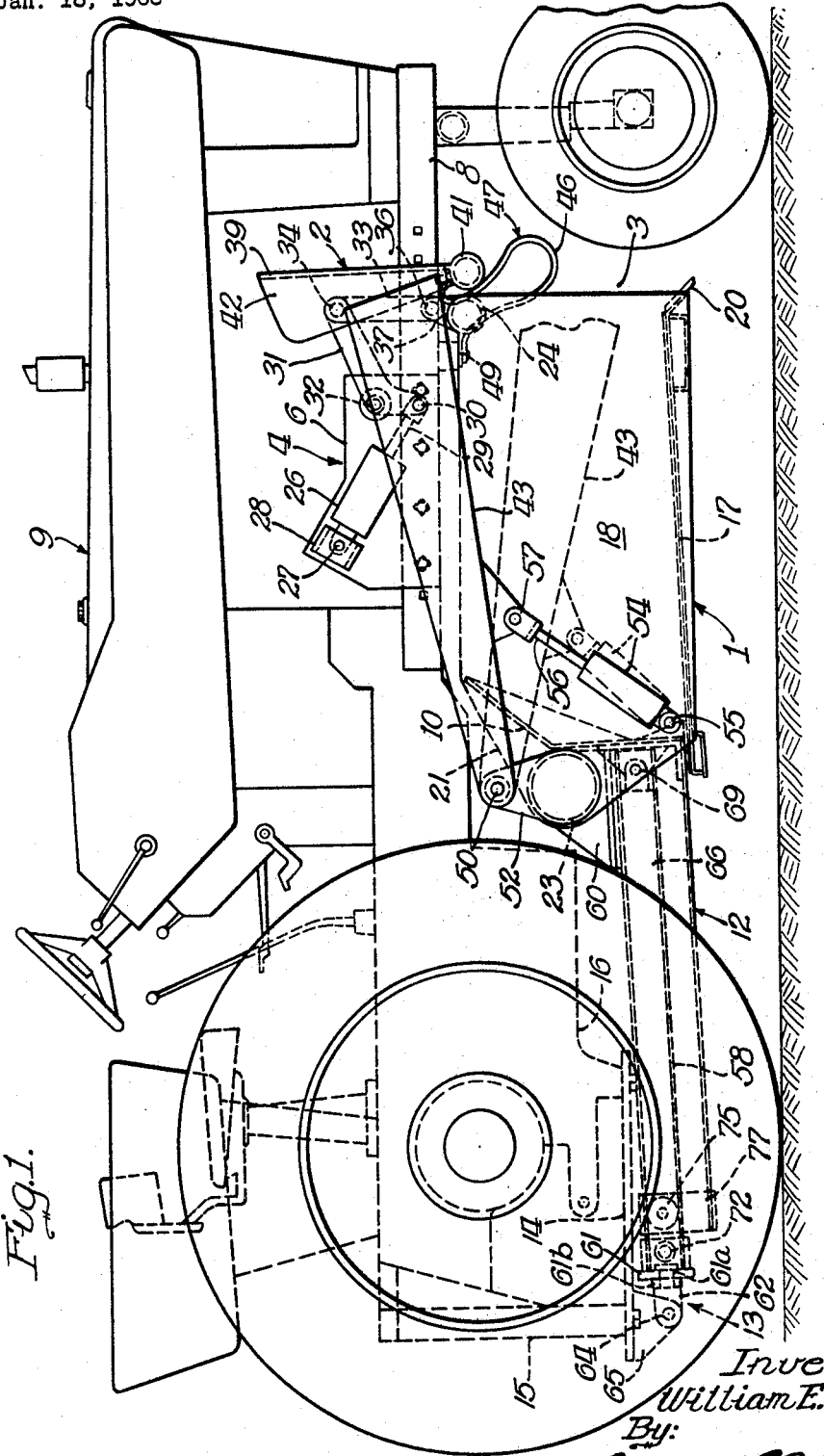
Inventor:
William E. Martin

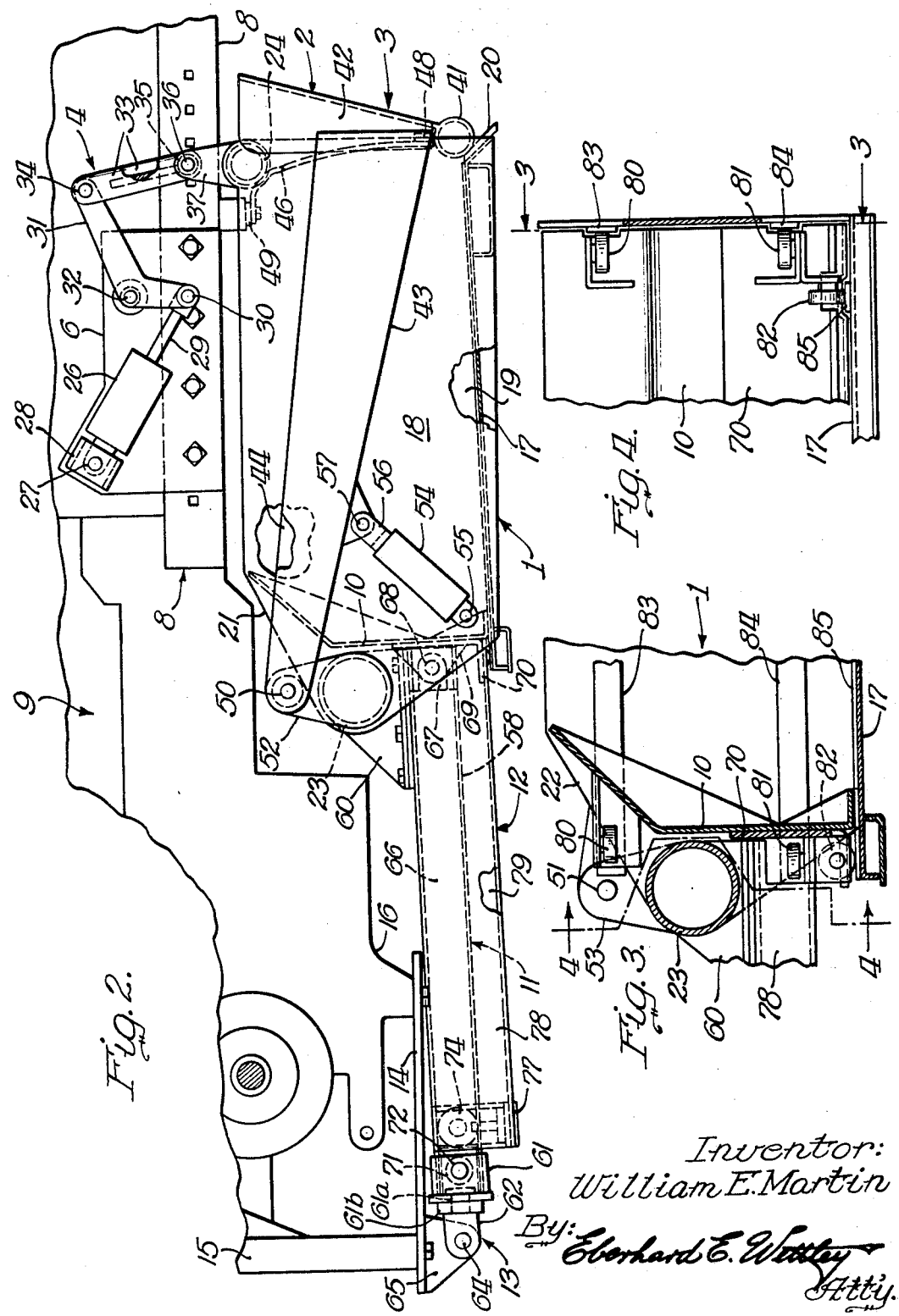

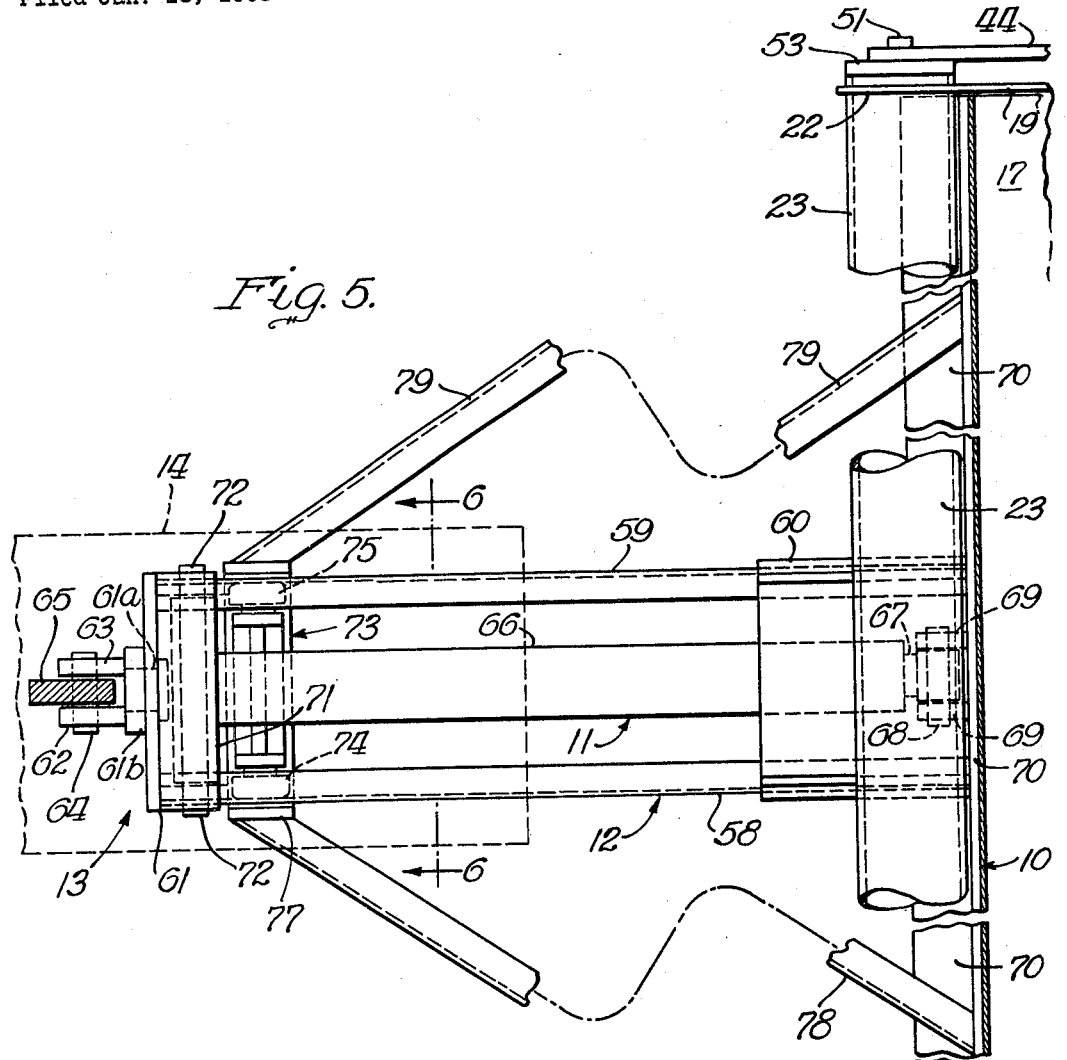

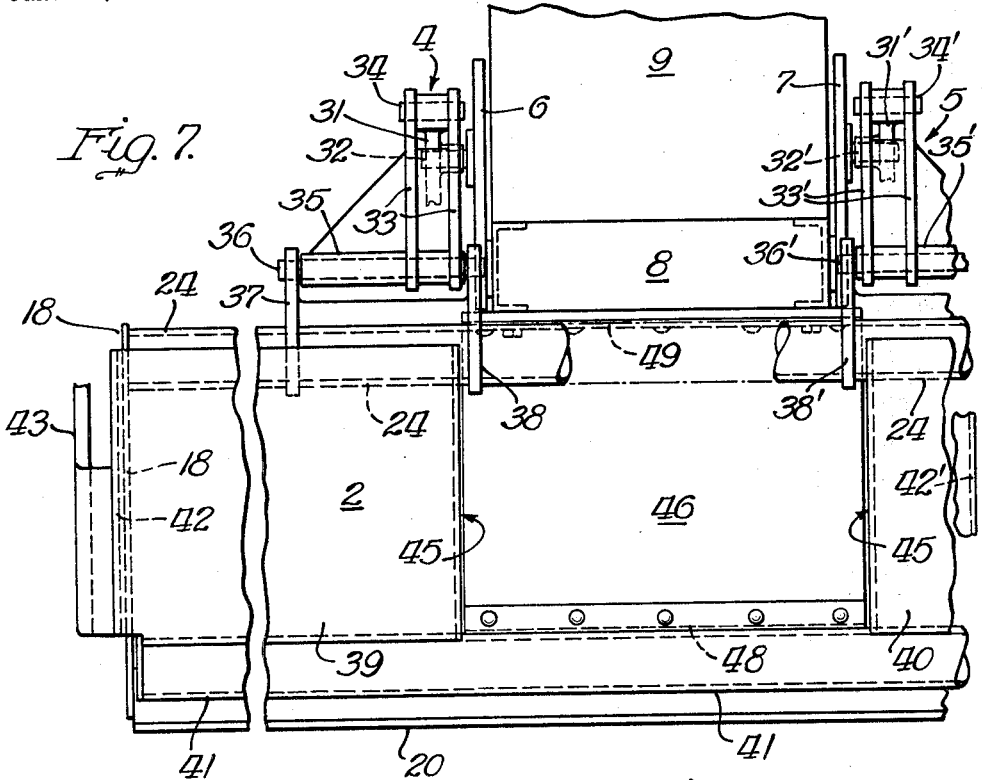

United States Patent Office 3,501,856
Patented Mar. 24, 1970

3,501,856
SELF-CONTAINED SCRAPER ATTACHMENT
ASSEMBLY FOR FARM TRACTOR
William E. Martin, c/o The Martin Company,
P.O. Box 187, Kewanee, Ill. 61443
Filed Jan. 18, 1968, Ser. No. 698,943
Int. Cl. E02f 3/62
U.S. Cl. 37—126
10 Claims

ABSTRACT OF THE DISCLOSURE

An apparatus comprising an attachable self-contained independently operable arrangement for bodily mounting upon a conventional type of farm tractor including an earth working scraper with hood therefor and with a material ejector all for material handling purposes.

---

This invention relates to an apparatus having workable power means all combined into a unitary compact arrangement bodily mountable upon a farm tractor and which arrangement provides an earth working material handling scraper that may be maneuvered by the operative manipulation of the tractor.

More specifically, this invention is directed to an apparatus comprising a self-contained assembly having a material handling scraper bowl with forward adjustable closure means on the bowl and a material ejecting mechanism in said bowl, and wherein the bowl support means are equipped with mounting units by which the entire working assembly may be bodily mounted upon a conventional farm tractor for mobile maneuverability and to receive hydraulic pressure fluid under the control of the tractor operator through suitable valves and fluid lines connected with the hydraulic power means that regulate and manipulate the scraper bowl per se.

One of the objects of this invention is to provide a compact earth scraper with associated power means and mechanisms to control and to position the scraper bowl into its various working attitudes and for material intake and material discharge functions and to provide such a combination as a complete unitary self-contained assembly having convenient mounting units for attachment with a conventional type of farm tractor or similar mobile power vehicle to bodily support the entire scraper assembly from rigid tractor structure or structures to convert such a tractor into a material handling facility.

Another object is to provide simple and readily accessible mounting base elements that are easily fastened to a farm tractor and which comprise the sole supports for the scraper assembly through which the entire scraper combination with the working parts thereof are suspended in workable relation to the tractor and therebeneath to thereby convert the tractor into an earth working vehicle.

A still further object is to provide a material handling scraper assembly with attaching devices that support the scraper assembly at points that are in fore and aft transverse plane locations on a tractor and which devices are two in laterally spaced locations at one fore and aft point of location and one for a median fore and aft line connection on the tractor at the other fore and aft point of location.

A further object is to provide a three point attachment arrangement to rigidly fasten the entire scraper assembly for dependent support from rigid tractor structure to carry the front and rear ends of the scraper assembly under the length of the tractor along the line of travel of the tractor and wherein the three point attachment arrangement includes operable means to permit lateral rocking and adjustment of the scraper bowl angle in relation to the tractor and to the surface over which the tractor is supported.

Another object is to support the scraper assembly from a tractor for tilting in respect to the horizontal about a single swivel support means at one end of the assembly and to provide laterally spaced supports on the tractor with independent power means to raise or lower the opposite outward sides of the scraper assembly either in unison or in opposite alternate manner to cause a given selected tilt of the scraper assembly in relation to the tractor or to the surface being worked.

Another object is to provide the scraper assembly with a blade ejection mechanism for the bowl which includes means to house an ejection blade power cylinder and to furnish a trackway or guideway and roller guide means for the ejection blade to hold the blade upright and in transverse alignment in the bowl providing an ejection mechanism and support combination by which the bowl is swingably mounted and supported from a tractor part or portion and through which means the tractor transmits the pushing force to move the bowl to load, etc.

A further object is to provide a link structure for the scraper bowl which connects between the tractor and a portion of the scraper assembly to control excessive lateral sway or motion of said scraper assembly and this functions as stabilizing means to maintain better alignment of the scraper assembly in relation to the tractor and along its line of travel.

As a further object the above stabilizing means are preferably provided to one side of the tractor and constructed to extend to a laterally outward scraper bowl part and said means comprises interconnected parallel link members that function as stabilizers and to also freely permit raising and lowering of the bowl as well as the tilting thereof under operation.

All other objects and advantages relating to the present invention shall hereinafter be noted in or shall become apparent from the following detailed description having reference to the accompanying drawings forming a part of this specification.

In the drawings:

FIG. 1 is a side elevational view of the unitary scraper assembly of the present invention as the same appears when attached to and bodily supported from a conventional type of farm tractor, the tractor being more or less diagrammatically shown;

FIG. 2 is an enlarged side elevational view of the tractor attached scraper assembly to better illustrate the scraper bowl and its working mechanisms plus the securing or attaching units;

FIG. 3 is a detailed cross sectional view of a fragmentary portion of the scraper bowl taken in a longitudinal plane just inside the near wall or face of the bowl in FIG. 2; and also as generally viewed along the line 3—3 in FIG. 4;

FIG. 4 is another detailed cross sectional view of the scraper bowl as generally viewed along the line 4—4 in FIG. 3;

FIG. 5 is a fragmentary plan view of the rear portion of the scraper bowl to show the blade ejection means and the support means for the rear portion of the scraper assembly;

FIG. 6 is a detailed sectional view of the support means and ejector blade guideway system substantially as viewed along the plane of the line 6—6 in FIG. 5;

FIG. 7 is a front or loading end view of the scraper assembly with portions broken away and omitted for the sake of clarity;

FIG. 8 is a front end view of a fragmentary portion of the left side of the scraper bowl to show the stabilizing link structure for the bowl; and FIG. 9 is a detailed view of a modified rear end bowl support mechanism to permit free lateral bowl tilt in relation to the tractor.

The self-contained scraper assembly comprises in general a scraper bowl 1, a hood structure 2 to open and close the material working end 3 of the bowl 1, operable twin supporting and height control mechanisms 4 and 5 extending between the bowl 1 and terminating in securing plates 6 and 7 respectively for rigid bodily securement to a rigid or fixed structure such as the chassis 8 of a farm tractor 9. The scraper assembly further includes a material ejector blade 10 in bowl 1 which ejector means is actuated and controlled by power means 11 housed in a rearward bowl supporting structure 12 which terminates in a single securing means 13 that is provided with an attachment means such as plate 14 that is releasably attached to a rear rigid tractor part or parts such as the tractor drawbar hanger 15 and the tractor transmission housing 16.

The foregoing description of the scraper assembly of the present invention indicates the principle that the entire scraper arrangement is complete in and of itself having self-contained mechanisms serving the scraper bowl and controlling the latter as needed for material handling and that there are three attachment units provided terminal structures for the scraper assembly and by means of which such assembly can be bodily secured or mounted upon an existing mobile power vehicle such as the farm tractor 9 to be maneuvered by such tractor which latter is easily converted into a material handling facility by the bodily addition of the scraper assembly described.

The bowl 1 is a light weight scoop means and has a bottom 17, side walls 18 and 19, front edge cutting blade 20, together with rearward side wall extensions 21 and 22 cross connected and reinforced by tube 23, one of the main stabilizing and support structures of the bowl and its other contiguous parts and operable means. At the front end of bowl 1, a structural support means such is the overhead cross tube 24 is connected integrally with bowl sides 18 and 19 as best shown in FIGS. 2 and 7 to form the front bowl end terminal member for the two laterally spaced operable bowl height control mechanisms 4 and 5.

The mechanisms 4 and 5 are alike except left and right hand as seen in FIG. 7. The same reference numerals will indicate like parts in mechanisms 4 and 5, but those in 5 will be primed numerals. The apparatus 4, therefore, comprises a double acting power cylinder 26 pivotally mounted on pin 27 secured by bracket 28 to the mounting or securing plate 6, the cylinder ram 29 having connection on pin 30 of the bell crank 31 that rocks on stub shaft 32 carried by plate 6, and baffle connected dual links 33 are pivotally joined at pin 34 with bell crank 31 and the links 33 terminate in a bearing sleeve 35 on the shaft or cross pin 36 secured to spaced arms 37–38 that are rigidly mounted and made a part of the left front end portion of the bowl cross tube 24. By supplying hydraulic fluid under valved control from the hydraulic fluid source of the tractor 9 to the cylinder 26, the described link mechanism 4 will raise, lower or adjust the front bowl end relative to plate 6 and tractor 9 as required or elected by the tractor operator to meet the various specific conditions of operation.

Thus the described mechanisms 4 and 5 and their tractor mounting plates 6 and 7 are all a part of the scraper assembly and these devices and connected parts serve as attachment instrumentalities to mount the scraper assemblies upon a mobile vehicle such as the tractor 9 shown in the drawings.

The hood structure 2 comprises a divided baffle wall unit having walls 39 and 40 mounted on a bottom support tube 41 and each of the walls 39 and 40 have side wings such as 42 with attached arms 43 and 44 to raise and lower the hood per se. The central area of the hood structure is cut out as at 45 to clear the tractor structure and a heavy sturdy flexible closure apron 46 is carried in the gap 45 to close this area with the hood means down and which apron folds out of the way of the tractor somewhat as shown at 47 in FIG. 1, when the hood is brought to a raised position as there shown. This divided hood arrangement is similar to that shown in my Patent No. 3,302,316 issued Feb. 7, 1967. In the present construction the apron 46 is secured to flange 48 on tube 41 and connects with a securing strip 49 that can be readily attached to the underside of the tractor as shown for example in FIG. 7 or such strip can be attached to plates 6 and 7 if so desired.

The hood arms 43 and 44 are swingably carried on aligned pins 50 and 51 supported by arms 52 and 53 that are part of the bowl tube 23 and rigid therewith. Each arm 43 and 44 is controlled by power means such as shown in FIGS. 1 and 2, which each comprise a double acting hydraulic cylinder 54 swingable on pin 55 on side 18 of the bowl and having its ram 56 pivotally joined with pin 57 bracket secured to arm 43. Operation of the cylinders such as 54 will raise or lower the hood means by the arms 43 and 44 described from a bowl closed position as shown in FIG. 2 into a bowl open position as in FIG. 1, or into any intermediate position that may be selected.

The rear bowl end support structure 13 comprises a pair of spaced channel members 58 and 59 connected rigidly with the bowl tube 23 by the bracket means 60 best shown in FIGS. 2, 5 and 6. The channel members 58 and 59 tie solidly into a socket member 61 provided with a longitudinally positioned swivel pin 61a connected with a hub bearing member 61b that has spaced ears 62 and 63 that carry pivot pin 64 provided with a supporting lug 65 which is rigidly mounted on the single securing means or plate 14 that attaches to the tractor as previously described. With the use of pin 61a between bracket means 60 and hub member 61b the entire bowl 1 can tilt laterally relatively to its support means 14 and 65.

The described support structure 13 thus provides a single support means for the bowl on the longitudinal median line of the tractor 9 and the forward dual spaced height control mechanisms 4 and 5 provide two lateral support points for the bowl operative at either side of the tractor to raise or lower the bowl unit 1 or to adjust the lateral tilt thereof. The support locations of the scraper assembly are actually well designated by the three mounting plates 6, 7 and 14 which thus provide the three point attachable suspension units that actually carry structures 4, 5 and 13 respectively.

The operation of the ejector means or blade 10 is accomplished by power cylinder 66 housed in the channel support structure described, the cylinder having its ram 67 pivoted at 68 to bracket 69 on the transverse L-bar 70 of the blade 10. The other end of cylinder 66 is provided with sleeve 71 pivoted on shaft or pin 72 mounted in the socket member 61. The blade 10 is transversely and vertically stabilized and guided through the bowl by the wheel assembly 73 best shown in FIGS. 5 and 6, wherein wheels 74 and 75 ride in support channels 58 and 59 and such wheels are carried on joined U-bars 76 and 77 to which the diagonal braces 78 and 79 are secured, such braces being fixedly attached to the L-bar 70 on the blade 10. As the cylinder ram 67 moves the ejector assembly through the bowl 1, the wheel assembly 73 moves along the bowl support arrangement comprising channels 58 and 59 and braces 78 and 79 maintain the ejector blade in upright and lateral positions in the bowl during such movement.

Further guide means to coact with the wheel and channel guideways 58 and 59 are provided in the form of upper and lower rollers 80 and 81 mounted on the outer ends of the blade 10 as shown in FIGS. 3 and 4 and a support roller 82 carries the blade across the bottom 17 of the bowl. Wear tracks or strips 83 and 84 are on the bowl sides and the track strip 85 is on the bowl bottom or floor to accommodate roller 82. This same bracket attached roller means is also provided on the far side of the ejector blade to considerably reduce blade friction with the bowl and to increase the ease of bowl material ejector operation and bowl discharge through the described ejector means.

Since there are two lateral bowl supporting mechanisms such as 4 and 5 to each side of the center line of tractor travel or with respect to the longitudinal median line of the tractor, with a single swivel bowl support facility such as 13 on the center line of the tractor, it is possible through selected manipulation of the mechanisms 4 and 5 to cause lateral bowl tilting or canting to make a nonlevel surface cut with the bowl by the alternate adjustment of the dual individual cylinder means 26 at each side of the tractor.

Such bowl canting or lateral tilting action may be further accomplished through the use of the modified mechanisms shown in FIGS. 8 and 9 which include a suitable rocking bearing pivot in the link means as at 86 where the bell crank 31 joins with pin 34 and the single rear securing means 13 is provided with a ball and socket connection such as 87 between the socket member 61 and a bracket 88 shown in FIG. 9 to secure the rear bowl support structure 12 to plate 14 that mounts on the tractor. These arrangements or similar flexing connecting means will again provide easy tilt action for the bowl to perform angle cuts from the surface being worked by the scraper assembly.

The FIG. 8 construction includes a stabilizing link means 89 that may be used at either side of the tractor for the scraper assembly to counteract excessive side sway or motion of the bowl under operation. Link means 89 comprises a pair of parallel equal length links 90 and 91 that are pivotally mounted on pins 92 and 93 carried by a bracket 94 mounted upon a forward extension 95 forming a part of plate 6. The outboard ends of the links 90 and 91 are pivoted upon pins 96 and 97 on the vertically positioned connecting link 98 that is pivotally connected with pin 99 to a bracket 100 fastened upon or formed integrally with the outer end portion 101 of the forward bowl cross tube 24. This dual link arrangement and the pin mountings named comprises a parallelogram mechanism which is freely active to move with the manipulations of the bowl 1 and such mechanism will act to stabilize the suspended bowl structure in relation to the tractor and hold the bowl in its operative line of directed motion under working conditions. If desired, the same type of an arrangement may be used on both sides of the bowl for connection with either side of the tractor mounting units supporting the bowl.

With this described linkage, the bowl is permitted to raise and lower or to be angularly canted and the link means will function to counteract side displacement of the bowl during the normal manipulation of such bowl to keep the scraper bowl assembly in good tracking position and in well aligned relationship to the supporting vehicle.

The foregoing description is directed to certain preferred forms of this invention that are given by way of example and not by way of limitation. It is to be understood that certain modifications or changes are possible in the apparatus shown and described in the combinations disclosed or in the individual elements shown without departing from the general inventive concept. The extent of such modifications and/or changes are, therefore, only to be governed by the breadth and scope of the language hereinafter contained in the appended claims that are directed to the operative working mechanisms comprising the self-contained scraper attachment assembly for farm tractors representing the present invention.

What I claim is:

1. In a wholly self-contained scraper assembly adapted for bodily attachment to a powered vehicle, comprising, in combination, a scraper bowl mounted below the vehicle between the fore and aft wheels thereof, a transverse ejector blade in the bowl for movement therethrough, bowl raising and lowering mechanisms connected at lateral spaced locations on the bowl and operative in planes flanking the opposite sides of the vehicle, said mechanisms each providing a forward bowl mounting unit provided for securement upon the vehicle structure, and an extension structure rigid at its forward end with said bowl and projecting away from the bowl and under the rear axle of the vehicle, said extension structure terminating in a universal joint means including a rear mounting unit to carry said universal joint means, said rear mounting unit providing means to mount the rear portion of said extension structure upon said vehicle thereby supporting the rear bowl portion whereby the entire bowl and extension structure is bodily swingable from the rear mounting unit as selectively controlled by said forward bowl raising and lowering mechanisms, and power operated ejector mechanism connected between said extension structure and said ejector for moving said ejector through said bowl.

2. In the combination set forth in claim 1, wherein said scraper bowl comprises side walls joined with a bottom wall and a reenforcing cross member is mounted on the side walls at the forward end of the bowl and provided with connecting means to operatively receive said dual raising and lowering mechanisms respectively, said side walls having rearward extensions thereon connected with a rigid stabilizing transverse member located beyond the material carrying area of said bowl, and a bracket is provided on said transverse member for rigid connection with the rigid extension structure that supports the bowl from the rear mounting unit through said universal means.

3. In the combination set forth in claim 1, wherein said bowl raising and lowering mechanisms each comprise a power operated link apparatus functioning in a vertical plane adjacent one side of the vehicle and having supporting connection with the corresponding side of the bowl and wherein the mounting unit of said same mechanism comprises a vertical plate member adapted for rigid securement upon the sides of the vehicle facing the location of said mechanism.

4. In the apparatus of claim 1, wherein each of said raising and lowering mechanisms comprises a vertically arranged mounting plate for rigid attachment upon a side of the vehicle structure, a power cylinder swingably carried upon said plate and having a ram pivotally connected with one arm of a bell crank, said bell crank being rockably mounted on said mounting plate and having its other arm connected to pivot on a pin of a depending support link element, said support link element being pivotally joined with a support pin carried by a structural assembly having rigid connection with the adjacent side of the scraper bowl.

5. In the combination of claim 1, wherein said rear mounting unit of said rigid extension structure is fastened to the vehicle along the longitudinal median plane thereof and wherein said forward bowl mounting units are fastened at laterally spaced points on the vehicle structure located to either side of the longitudinal median plane of the vehicle to thus provide a three point suspension system for the complete support of and position regulation of the scraper bowl in respect to the vehicle and in respect to the surface being worked under the vehicle.

6. The combination of claim 5 including rockable means in each raising and lowering mechanism and rockable means in the universal joint means of the extension structure to permit lateral tilting or canting of said bowl to either side in relation to the vehicle and to the surface under the vehicle with the selected angle of tilt being controlled by said raising and lowering mechanisms.

7. The combination of claim 5 including means for substantially constraining the bowl for movement in a vertical plane comprising swingable stabilizing link means mounted at one end of a first fixed pivot on the vehicle and at the other end of a second fixed pivot on a lateral portion of the bowl.

8. The combination of claim 1 wherein said extension structure comprises spaced apart coacting members disposed on opposite sides of said power operated ejector mechanism and providing trackways for a guide unit, a guide unit movable along said trackways, said guide unit being rigid with and spaced from said ejector blade for stabilizing said ejector blade during movement thereof.

9. In the combination of claim 8, wherein said guide means comprises a wheeled unit and said extension structure includes coacting facing channel members to provide trackways for said wheeled unit, and brace members are connected with said wheeled unit to extend diagonally away therefrom toward the ejector blade for laterally outward spaced connection with the blade to hold the blade in vertical position within the bowl and to keep said blade in its transverse position within the bowl during the actuation of the blade through said bowl by said power operated ejector mechanism.

10. In the combination of claim 9 with the addition of wheels supported at the ends of the ejector blade and on the rear face thereof, certain of said wheels being arranged to ride along the inside faces of the bowl sides and certain of said wheels being arranged to support the blade for movement over the bowl bottom to establish a free and unbinding blade in said bowl under operative actuation of the blade by said power operated mechanism acting along the defined ejector blade guide means in said extension structure.

References Cited

UNITED STATES PATENTS

| | | | |
|---|---|---|---|
| 3,052,049 | 9/1962 | Elenburg | 37—124 |
| 3,138,883 | 6/1964 | Elenburg | 37—124 |
| 3,149,429 | 9/1964 | Martin | 37—124 |
| 3,170,254 | 2/1965 | Martin | 37—124 XR |
| 3,302,316 | 2/1967 | Martin | 37—124 |
| 3,427,735 | 2/1969 | Martin | 37—126 |

EDGAR S. BURR, Primary Examiner

U.S. Cl. X.R.

37—124